(12) United States Patent
Morreale

(10) Patent No.: US 11,255,470 B2
(45) Date of Patent: Feb. 22, 2022

(54) HEAVY DUTY WING NUT

(71) Applicant: FMC Technologies, Inc., Houston, TX (US)

(72) Inventor: John Morreale, Houston, TX (US)

(73) Assignee: FMC Technologies, Inc., Houston, TX (US)

( * ) Notice: Subject to any disclaimer, the term of this patent is extended or adjusted under 35 U.S.C. 154(b) by 236 days.

(21) Appl. No.: 16/654,111

(22) Filed: Oct. 16, 2019

(65) Prior Publication Data

US 2020/0124211 A1 Apr. 23, 2020

Related U.S. Application Data

(60) Provisional application No. 62/749,358, filed on Oct. 23, 2018.

(51) Int. Cl.
*F16L 19/025* (2006.01)
(52) U.S. Cl.
CPC .................. *F16L 19/025* (2013.01)
(58) Field of Classification Search
CPC ......... F16L 19/02; F16L 19/025; F16L 19/06; F16L 23/00; F16B 37/00; F16B 37/16
USPC .................. 285/386, 387, 388, 414; 411/427
See application file for complete search history.

(56) References Cited

U.S. PATENT DOCUMENTS

| | | | |
|---|---|---|---|
| 4,802,695 A | 2/1989 | Weinhold | |
| 6,945,569 B1 * | 9/2005 | Diaz | F16L 19/025 285/334.5 |
| 2016/0377207 A1 | 12/2016 | Witkowski et al. | |

* cited by examiner

*Primary Examiner* — Aaron M Dunwoody
(74) *Attorney, Agent, or Firm* — Osha Bergman Watanabe & Burton LLP

(57) ABSTRACT

A wing nut may include a body having a first part extending from a first end surface to a parting line and a second part extending from the parting line to a second end surface. A passage may axially extend through the body, the passage defining an interior surface of the body. An internal threaded section may be formed on an interior surface of the first part. An internal shoulder may be formed on the interior surface of the second part. A stress relief may be formed on the interior surface of the second part between the internal shoulder and the parting line. A rib may extend inward from the interior surface of the second part, the rib being intermediate the stress relief and the internal threaded section. At least one lug may extend radially from the exterior surface of the body.

19 Claims, 5 Drawing Sheets

HEAVY DUTY WING NUT

CROSS-REFERENCE TO RELATED APPLICATIONS

This application claims benefit, under 35 U.S.C. § 119, of U.S. Provisional Application Ser. No. 62/749,358 filed on Oct. 23, 2018 and entitled "Heavy Duty Wing Nut." The disclosure of this U.S. Provisional application is incorporated herein by reference in its entirety.

BACKGROUND

Hammer Unions are widely used throughout the energy industry. Hammer Unions come in many sizes, shapes and pressure ratings, and when used correctly they are a safe and reliable means of transporting fluid for quick make-up and break-out pipe and fitting connectors. The hammer union is a connection consisting of two joints coupled by a threaded nut (i.e., a male part, a female part and a nut part). In addition, protrusions may be provided on the threaded nut to aid in tightening the connection and energize the seals. The hammer union allows for quick connecting the pipelines and flexible hose assemblies in the oil and gas industry. Hammer unions may be utilized both offshore and onshore to transfer petroleum, gas, drilling mud, cement, water, air and many other media. In use, hammer unions may be subjected to stresses from cyclic bending loads fluid flow, mismatched hammer unions, and improper make-up of the connections in the hammer union which may result in fractures propagating into the nut part of the hammer unions. Said fractures may lead to failure of the hammer union which in turn may cause the nut parts being propelled in any direction and uncontrolled release of fluids that may harm workers or the surrounding environment.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, the embodiments disclosed herein relate to a wing nut, such as may be used in a hammer union. The wing nut may include a body having an axial length defined between first and second end surfaces, the body having an exterior surface extending between the first and second end surfaces. The body may comprise a first part extending from the first end surface to a parting line and a second part extending from the parting line to the second end surface. A passage may axially extend through the body from the first end surface to the second end surface, wherein the passage defines an interior surface of the body. An internal threaded section may be formed on an interior surface of the first part. An internal shoulder may be formed on the interior surface of the second part and may define a portion of the passage. A stress relief may be formed on the interior surface of the second part between the internal shoulder and the parting line. A rib may extend inward from the interior surface of the second part, wherein the rib is intermediate the stress relief and the internal threaded section. At least one lug may extend radially from the exterior surface of the body.

In some embodiments, the internal shoulder may define a smallest inner diameter of the interior surface of the body.

In one or more embodiments, a depth of the stress relief may define a largest inner diameter of the interior surface of the body.

In one or more embodiments, the stress relief may comprise a first radius relief on the internal shoulder and a second radius relief on the rib.

In one or more embodiments, the stress relief may comprise an angle of relief between the first radius relief and the second radius relief.

In one or more embodiments, the first radius relief may be less than the second radius relief.

In one or more embodiments, the wing nut may also include at least one locating pad on the second end surface.

In one or more embodiments, the at least one lug may extend axially from the first end surface to the second end surface.

In one or more embodiments, a thickness of the internal shoulder may be less than a thickness of a front portion of the first part.

In one or more embodiments, a radius from between the rib and the internal threaded section may have a radius larger than a full root radius of the internal threaded section.

In one or more embodiments, the parting line may be aligned with the radius between the rib and the internal threaded section In one or more embodiments, the wing nut may also include a higbee thread at a crest from the first end surface as a blunt start thread.

In another aspect, embodiments herein may be directed toward a hammer union. The hammer union may include: a male sub having a sealing surface at an end of the male sub; a female sub having external threads at an end of the female sub, wherein the sealing surface of the male sub abuts against the end of the female sub; and a wing nut configured to sealingly couple the male sub and the female sub together. The wing nut may be as described in one or more of the embodiments above.

In one or more embodiments, the internal threaded connection of the wing nut may be threaded on the external threads of female sub.

In one or more embodiments, the internal shoulder of the wing nut may abut against a shoulder of the sealing surface of male sub.

In one or more embodiments, the at least one lug may translate a force to rotate the wing nut.

In one or more embodiments, the ends of the male sub and the female sub may be enclosed in the passage of the wing nut.

In one or more embodiments, the hammer union may further include a seal between the male sub and the female sub.

In yet another aspect, embodiments disclosed herein may be directed toward a method for coupling a hammer union. The method may include: coupling the male sub to the female sub with a wing nut, wherein the wing nut is as described in one or more of the embodiments herein.

In one or more embodiments, the method may also include enclosing the sealing surface of the male sub and the end of a female sub within the passage of the wing nut.

Other aspects and advantages will be apparent from the following description and the appended claims.

DETAILED DESCRIPTION

Figure 1:
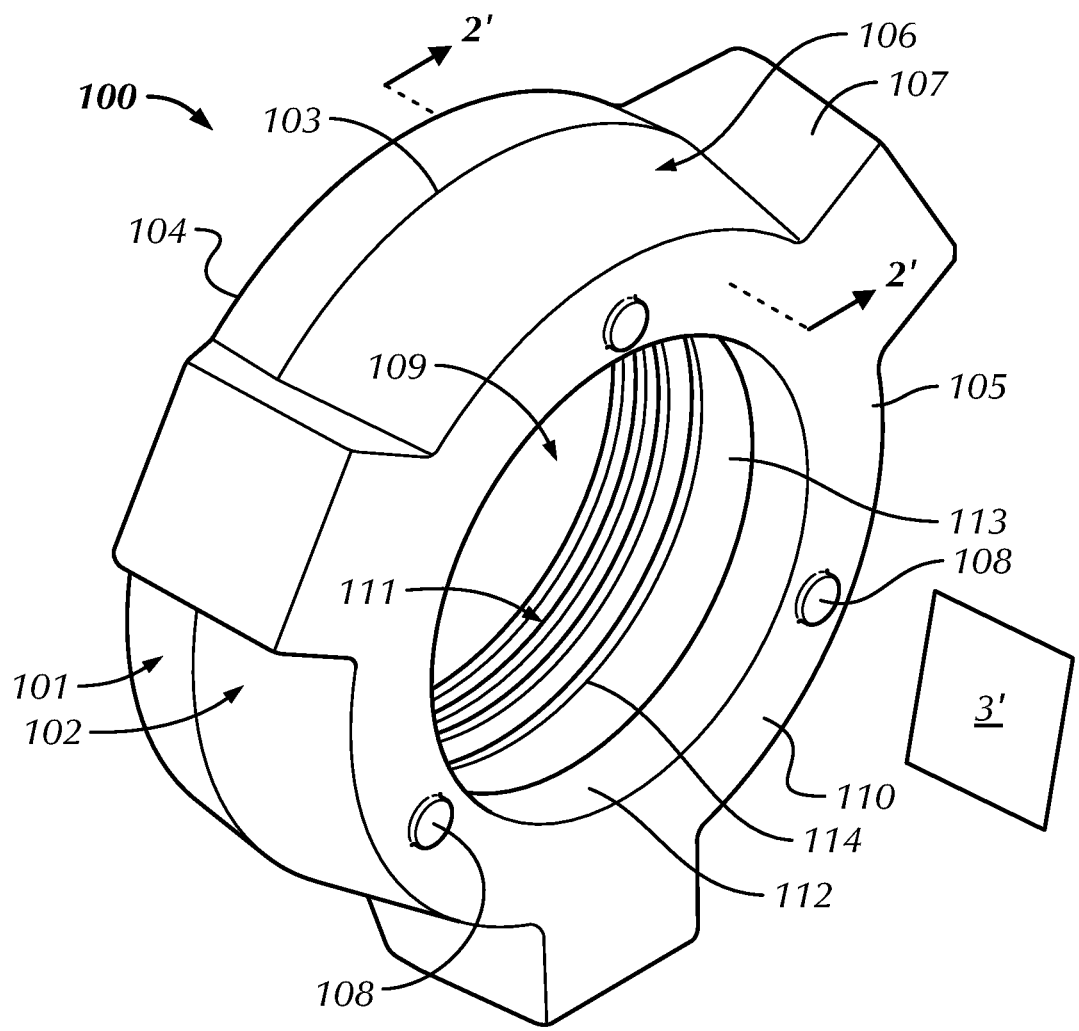
FIG. 1 is a perspective view of a heavy duty wing nut in accordance with one or more embodiments of the present disclosure.

Embodiments of the present disclosure are described below in detail with reference to the accompanying figures. Like elements in the various figures may be denoted by like reference numerals for consistency. Further, in the following detailed description, numerous specific details are set forth in order to provide a more thorough understanding of the claimed subject matter. However, it will be apparent to one having ordinary skill in the art that the embodiments described may be practiced without these specific details. In other instances, well-known features have not been described in detail to avoid unnecessarily complicating the description.

Further, embodiments disclosed herein are described with terms designating a sub in reference to flow lines at a drilling rig, but any terms designating subs (i.e., any pipes or hoses) at a rig type (i.e., any land rig or offshore rig) should not be deemed to limit the scope of the disclosure. It is to be further understood that the various embodiments described herein may be used in various stages of a well, such as rig site preparation, drilling, completion, abandonment etc., and in other environments, such as work-over rigs, fracking installation, well-testing installation, oil and gas production installation, without departing from the scope of the present disclosure. The embodiments are described merely as examples of useful applications, which are not limited to any specific details of the embodiments herein.

In one aspect, embodiments disclosed herein relate to a heavy duty wing nut, such as may be used in a hammer union, for example. A heavy duty wing nut may also be interchangeably referred to as a wing nut in the present disclosure. As used herein, the term "coupled" or "coupled to" or "connected" or "connected to" may indicate establishing either a direct or indirect connection, and is not limited to either unless expressly referenced as such. Wherever possible, like or identical reference numerals are used in the figures to identify common or the same elements. The figures are not necessarily to scale and certain features and certain views of the figures may be shown exaggerated in scale for purposes of clarification.

Wing nuts, according to embodiments herein, are apparatuses that may be used to couple a male and female sub to form a hammer union. In one or more embodiments, the components in hammer unions are a male sub with a sealing surface, a female sub with external threads, and a wing nut with internal threads to hold the components together. Depending on size, pressure rating and style, the hammer union may include an elastomeric seal. The male and female subs may be any type of sub allowing for flow, such as hose and pipe lines. As used herein, fluids may refer to slurries, liquids, gases, and/or mixtures thereof. The subs may also be used for transport of solids in other embodiments. In addition, one or more lugs may be integrated with the wing nut to aid tightening and loosening the wing nut. Furthermore, the threads of the female sub and wing nut may be any type of threads, such as ACEME threads, API threads, or specialty threads.

Turning to FIG. 1, FIG. 1 shows a perspective view of a wing nut 100 in accordance with one or more embodiments of the present disclosure. In one or more embodiments, the wing nut 100 may include a first part 101 and a second part 102. The first part 101 and the second part 102 may be molded or welded together at a parting line 103 to form a body extending axially from a first end surface 104 to a second end surface 105. It is noted that, in some embodiments, the parting line 103 may be located at a point aligned with a radius between a rib and a last thread acting on the wing nut 100. Additionally, an exterior surface 106 is formed from the first end surface 104 to the second end surface 105 as the outer surface of the wing nut 100. In addition, at least one lug 107 radially extends outwardly from the exterior surface 106. One skilled in the art will appreciate how the lug 107 may be used to apply torque on the wing nut 100. For example, a hammer or a wrench may be used to apply a force on the lug to rotate and torque the wing nut 100. While it is noted that FIG. 1 shows three lugs 107 equally spaced apart, one of skill in the art would understand that this is merely a non-limiting example and any number of lugs 107 may be used without departing from the present scope of the disclosure.

It is further envisioned that the second end surface 105 may include at least one locating pad 108. Further, while FIG. 1 shows three locating pads 108, one of skill in the art would understand that this is merely a non-limiting example and any number of locating pads 108 may be used without departing from the present scope of the disclosure.

In one or more embodiments, the body of the wing nut 100 may include a bore or passage 109 defining an inner surface 110 formed in the passage 109 from the first end surface 104 to the second end surface 105. In a non-limiting example, the wing nut 100 forms a ring made of metal such steel, iron, treated iron, or any metal alloy. As further illustrated by FIG. 1, the interior surface 110 may include an internal threaded section 111 formed on an interior surface of the first part 101. Further, an internal shoulder 112 may be formed on the interior surface of second part 102 and defining a portion of the passage 109. A stress relief 113 may be formed on the interior surface of second part 102 between the internal shoulder 112 and to the parting line 103. It is further envisioned that while a single stress relief is shown, the wing nut 100 may have multiple stress reliefs without departing from the scope of the present disclosure. One skilled in the art will additionally appreciate how a rib 114 or ribs may extend inwardly from interior surface 110 of the body. The interior surface of second part 102 is such that the rib 114 is formed in between the stress relief 113 and the internal threaded section 111. In combination, the stress relief 113 and the rib 114 form a relief area to reduce stresses. The interior surface 110 of the wing nut 100 will be further described as shown by the cross-sectional view in FIG. 2.

Figure 2:
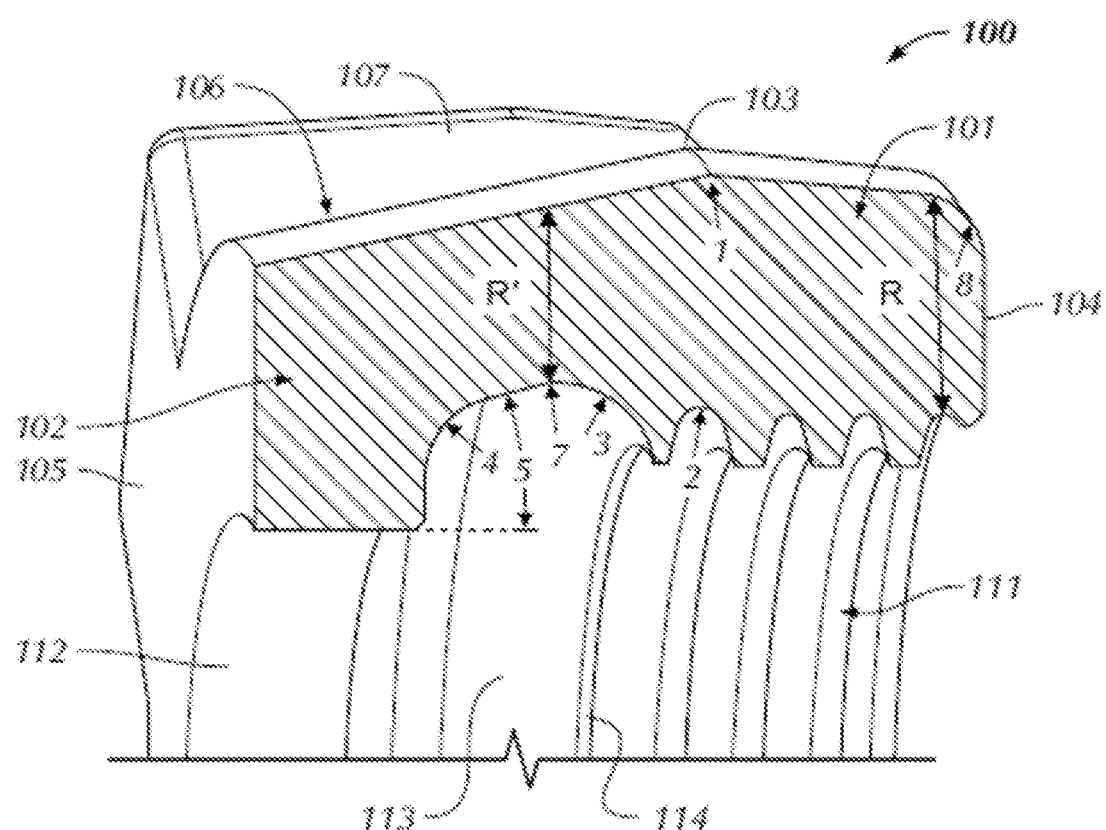
FIG. 2 is a cross-sectional view of the heavy duty wing nut of FIG. 1 along line 2-2 in accordance with one or more embodiments of the present disclosure.

In one or more embodiments, FIG. 2 illustrates a cross-sectional view taken along line 2'-2' of the wing nut 100 in FIG. 1. The parting line 103 is represented on the cross-section by line 1 that may aligned with a radius 2 formed between the rib 114 and the internal threaded section 111. In a non-limiting example, the radius 2 may be 40% to 60% larger than, such as 45% to 55% larger, than a full thread root radius of the internal threaded section 111.

In some embodiments, the stress relief 113 may include a first relief radius 3 tied to the rib 114, a second relief radius 4 tied to the internal shoulder 112, and an angle of relief 5 to form a depth 7 of the stress relief 113. In some embodiments, a radial thickness R of the wing nut 100 proximate first end surface 104 (e.g., a front portion 8 of the first part 101 from a radius of a first thread to a point on the exterior surface 106) may be greater than a radial thickness R' of the wing nut 100 between the depth 7 and a point on the exterior surface 106 that is axially aligned with the maximum depth. It is further envisioned that the radius 2, the first relief radius 3, the second relief radius 4, the angle of relief 5, a length of the rib 114, and the depth 7 of the stress relief 113 may all be optimized to reduce the stresses acting on the wing nut 100. In some embodiments, a radial thickness R of the wing nut proximate first end surface 104 may be greater than a radial thickness R' of the wing nut proximate second end surface 105.

Figure 3:
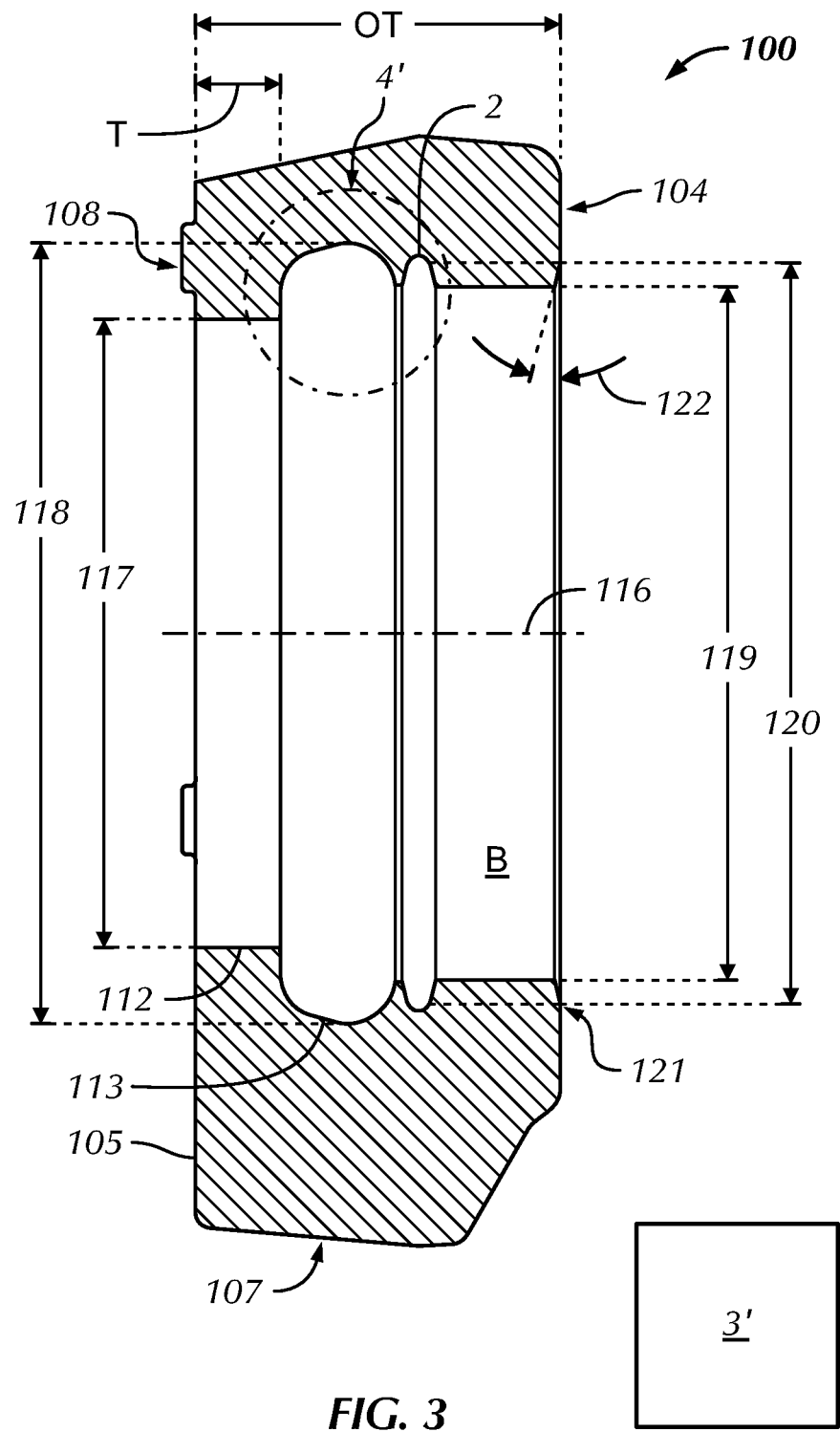
FIG. 3 is a cross-sectional view of the heavy duty wing nut of FIG. 1 along plane 3' in accordance with one or more embodiments of the present disclosure.

Now referring to FIG. 3, in one or more embodiments, FIG. 3 illustrates a cross-sectional view taken along plane 3' of the wing nut 100 in FIG. 1. For simplicity purposes only, the internal threaded section 111 is represented by a box B to help illustrated dimensional elements of the wing nut 100. The wing nut 100 has an overall thickness OT extending from the first end surface 104 to the second end surface 105 that does not include the locating pads 108. Additionally, a thickness of the lugs 107 may be less than the overall thickness OT of the wing nut 100. Furthermore, the wing nut 100 is formed about a central axis 116 on which the body is centralized. Additionally, the internal shoulder 112 has thickness to be a portion of the wing nut 100 extending inwardly towards the central axis 116. One skilled in the art will appreciate how the internal shoulder 112 has an inner surface diameter 117 which may be a smallest inner diameter of the wing nut 100. In addition, the stress relief 113 may have an inner surface diameter 118 which may be a largest inner diameter of the wing nut 100. In some embodiments, an inner surface diameter 119 of the radius 2 may be smaller than the inner surface diameter 118 of the stress relief 113 but larger than an inner surface diameter 120 of the box B. It is further envisioned that a crest 121 having an acute angle 122 from the first end surface 104 may have a higbee thread formed as a blunt start thread of the internal threaded section 111.

Figure 4:
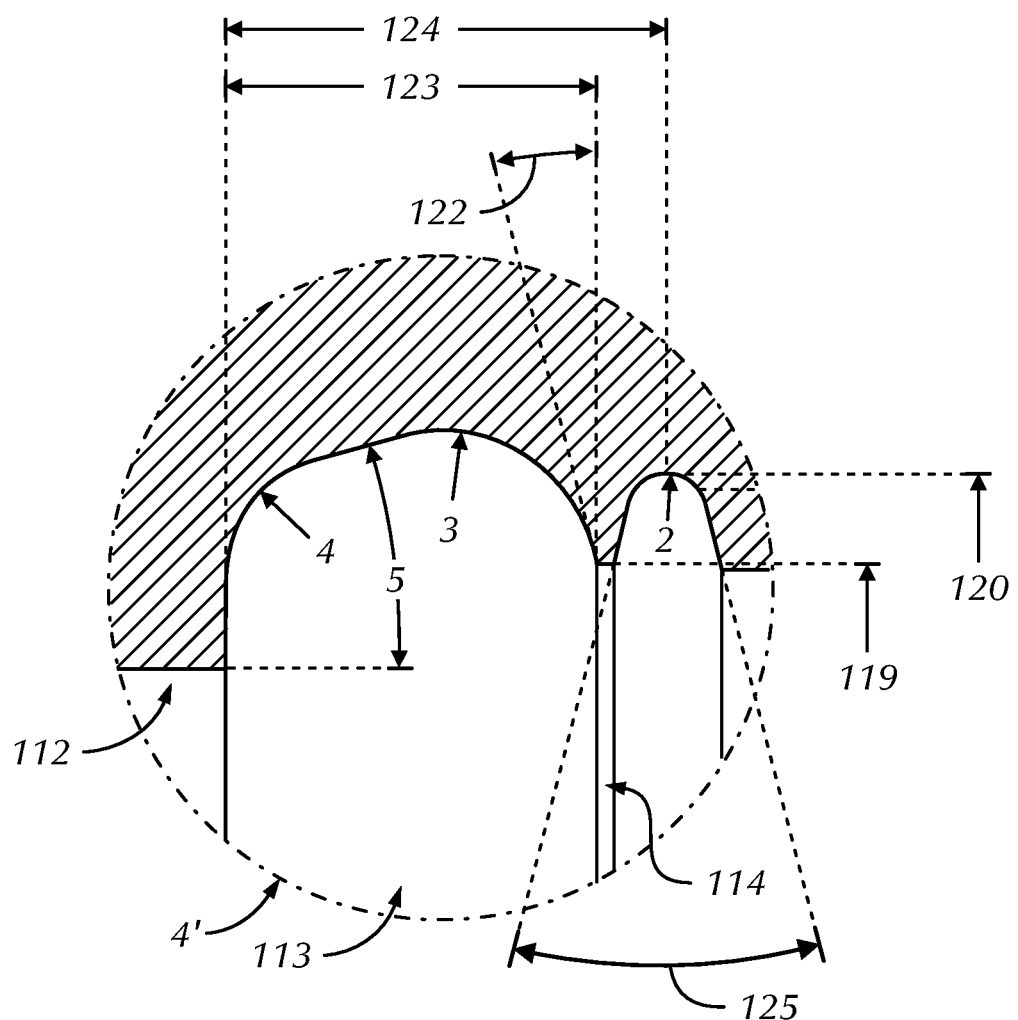
FIG. 4 is a blown-up view of the heavy duty wing nut of FIG. 3 within circle 4' in accordance with one or more embodiments of the present disclosure.

FIG. 4, in one or more embodiments, illustrates a blown-up view of the wing nut 100 taken along circle 4' of the cross-sectional view shown in FIG. 3. The first relief radius 3 of the stress relief 113 tied to the rib 114 may be greater than the second relief radius 4 of the stress relief 113 tied to the internal shoulder 112. Additionally, the angle of relief 5 is formed from an end of the internal shoulder 112 the depth 7 of the stress relief 113 between the first relief radius 3 and the second relief radius 4 to be an acute angle. Further, an angle 122 from the rib 114 to the stress relief 113 may also be an acute angle. It is further envisioned that a distance from the internal shoulder 112 to the rib 114 defines a length 123 of the stress relief 113. Furthermore, a distance 124 from the internal shoulder 112 to the radius 2 is greater than the length 123, while the radius 2 forms an acute angle 125.

Figure 5:
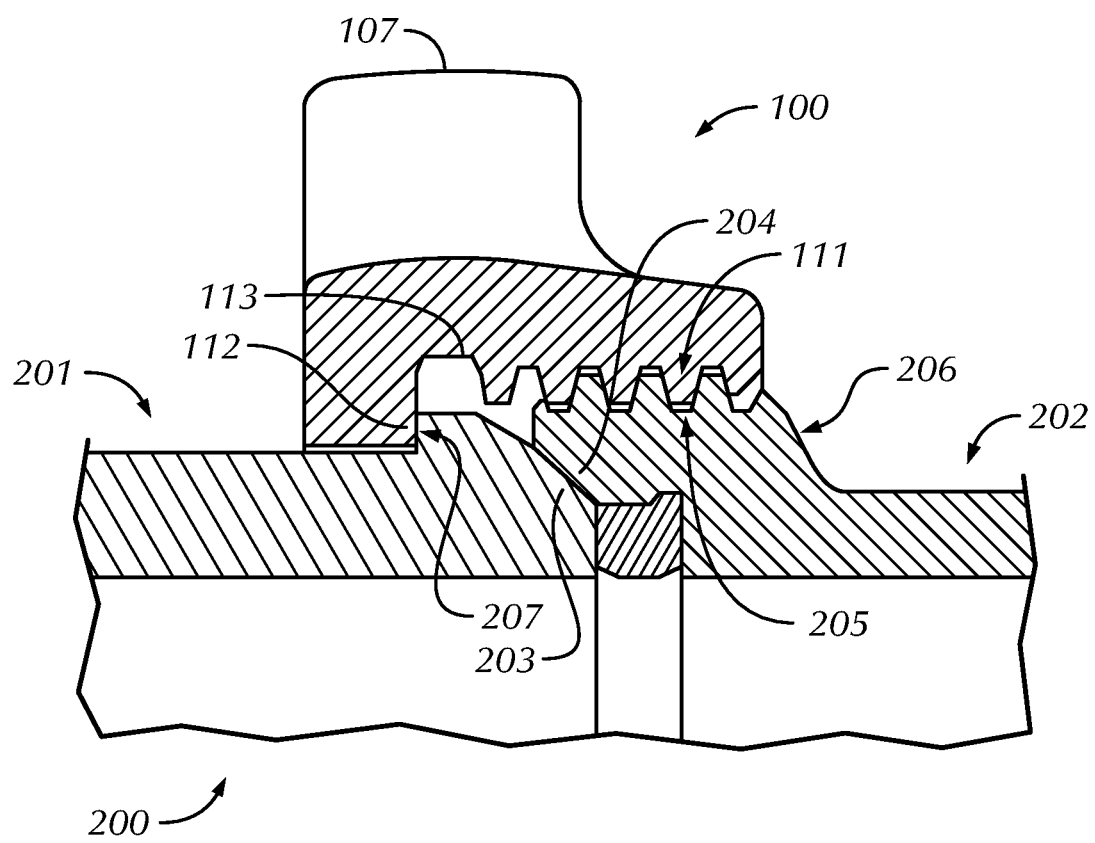
FIG. 5 is a partial-side view of the heavy duty wing nut of FIG. 1 coupled within a hammer union connection in accordance with one or more embodiments of the present disclosure.

As described above, the wing nut 100 may be used in a hammer union. FIG. 5, in one or more embodiments, illustrates a partial view of the wing nut 100 in a hammer union 200. The wing nut 100 sealingly couples a male sub 201 and a female sub 202 together. The male sub 201 may include a sealing surface 203 at an end of the male sub. Additionally, the sealing surface 203 of the male sub 201 abuts against an end 204 of the female sub 202. Further, while not shown, an elastic seal or multiple seals may be placed in between the male sub 201, the female sub 202, and the wing nut 100. In some embodiments, the female sub 202 may include external threads 205 on an outer surface 206 of the female sub. The external threads 205 may engage with the internal threaded connection 111 of the wing nut 100 such that when a force or torque is applied the lugs 107; the internal threaded connection 111 threads on or off the external threads 205. In addition, a sealing surface shoulder 207 of the male sub 201 abuts against the internal shoulder 112 when said force or torque is applied. One skilled in the art will appreciate how the wing nut 100 encloses the ends of the male sub 201 and the female sub 202 within the passage of the wing nut 100 such that when force or torque is applied the lugs 107, the male sub 201 is sealed against the female sub 202 and the wing nut 100 further seals the connection together to form the hammer union 200.

Furthermore, methods of the present disclosure may include use of the wing nut 100 and other structures, such as in FIGS. 1-5. Because the method may apply to any of the embodiments, reference numbers are not referenced to avoid confusion of the numbering between the different embodiments.

Initially, an end of a male sub is placed with a passage of a wing nut to have a shoulder of the male sub abut against an internal shoulder of the wing nut. Then the male sub is coupled to the female sub by having sealing surface of the male sub abut against an end of the female sub. Further, an internal threaded connection of the wing nut is threaded with external threads of the female sub. One skilled in the art will appreciate how the threading of the connections is aided by applying a force or torque, with a hammer or wrench, to at least one lug of the wing nut. Next, the passage of the wing nut enclosing the sealing surface of the male sub and the end of a female sub to form a seal between the sealing surface of the male sub and the end of the female sub. Furthermore, by sealing the male sub against the female sub, there may be no fluid leaks between the male sub and the female sub. Once the seal is created, a hammer union is created and ready for use.

While the present disclosure has been described with respect to a limited number of embodiments, those skilled in the art, having benefit of this disclosure, will appreciate that other embodiments may be devised which do not depart from the scope of the disclosure as described herein. Accordingly, the scope of the disclosure should be limited only by the attached claims.

What is claimed:

1. A wing nut for a hammer union, the wing nut comprising:
   a body having an axial length defined between first and second end surfaces, the body having an exterior surface extending between the first and second end surfaces,
   wherein the body comprises a first part extending from the first end surface to a parting line and a second part extending from the parting line to the second end surface;
   a passage axially extending through the body from the first end surface to the second end surface, wherein the passage defines an interior surface of the body;
   an internal threaded section formed on an interior surface of the first part;
   an internal shoulder formed on the interior surface of the second part and defining a portion of the passage;
   a stress relief formed on the interior surface of the second part between the internal shoulder and the parting line;

a rib extending inward from the interior surface of the second part, wherein the rib is intermediate the stress relief and the internal threaded section; and at least one lug extending radially from the exterior surface of the body, wherein the stress relief comprises a first radius relief on the internal shoulder and a second radius relief on the rib.

2. The wing nut of claim 1, wherein the internal shoulder defines a smallest inner diameter of the interior surface of the body.

3. The wing nut of claim 2, wherein a depth of the stress relief defines a largest inner diameter of the interior surface of the body.

4. The wing nut of claim 1, wherein the stress relief comprises an angle of relief between the first radius relief and the second radius relief.

5. The wing nut of claim 1, wherein the first radius relief is less than the second radius relief.

6. The wing nut of claim 1, further comprising at least one locating pad on the second end surface.

7. The wing nut of claim 1, wherein the at least one lug extends axially from the first end surface to the second end surface.

8. The wing nut of claim 1, wherein a thickness of the internal shoulder is less than a thickness of a front portion of the first part.

9. The wing nut of claim 1, wherein a radius from between the rib and the internal threaded section has a radius larger than a full root radius of the internal threaded section.

10. The wing nut of claim 9, wherein the parting line is aligned with the radius between the rib and the internal threaded section.

11. The wing nut of claim 1, further comprising a higbee thread at a crest from the first end surface is a blunt start thread.

12. A hammer union, comprising:
a male sub having a sealing surface at an end of the male sub;
a female sub having external threads at an end of the female sub, wherein the sealing surface of the male sub abuts against the end of the female sub; and
a wing nut configured to sealingly couple the male sub and the female sub together, wherein the wing nut comprises:
a body having an axial length defined between first and second end surfaces, the body having an exterior surface extending between the first and second end surfaces,
wherein the body comprises a first part extending from the first end surface to a parting line and second part extending from the parting line to the second end surface,
a passage axially extending through the body from the first end surface to the second end surface, wherein the passage defines an interior surface of the body,
an internal threaded section formed on an interior surface of the first part,
an internal shoulder formed on the interior surface of the second part and defining a portion of the passage,
a stress relief formed on the interior surface of the second part between the internal shoulder and the parting line,
a rib extending inward from the interior surface of the second part, wherein the rib is intermediate the stress relief and the internal threaded connection, and
at least one lug extending radially from the exterior surface of the body,
wherein the stress relief comprises a first radius relief on the internal shoulder and a second radius relief on the rib.

13. The hammer union of claim 12, wherein the internal threaded section of the wing nut is threaded on the external threads of female sub.

14. The hammer union of claim 12, wherein the internal shoulder of the wing nut abuts against a shoulder of the sealing surface of male sub.

15. The hammer union of claim 12, wherein the at least one lug is configured to translate a force to rotate the wing nut.

16. The hammer union of claim 12, wherein the ends of the male sub and the female sub are enclosed in the passage of the wing nut.

17. The hammer union of claim 12, further comprising a seal between the male sub and the female sub.

18. A method for coupling a hammer union, the method comprising:
coupling the male sub to the female sub with a wing nut, wherein the wing nut comprises:
a body having an axial length defined between first and second end surfaces, the body having an exterior surface extending between the first and second end surfaces,
wherein the body comprises a first part extending from the first end surface to a parting line and second part extending from the parting line to the second end surface,
a passage axially extending through the body from the first end surface to the second end surface, wherein the passage defines an interior surface of the body,
an internal threaded section formed on an interior surface of the first part,
an internal shoulder formed on the interior surface of the second part and defining a portion of the passage,
a stress relief formed on the interior surface of the second part between the internal shoulder and the parting line,
a rib extending inward from the interior surface of the second part, wherein the rib is intermediate the stress relief and the internal threaded section, and
at least one lug extending radially from the exterior surface of the body,
wherein the stress relief comprises a first radius relief on the internal shoulder and a second radius relief on the rib,
abutting the internal shoulder of the wing nut against a shoulder of a sealing;
threading the internal threaded section with external threads at the end of the female sub; and
sealing the sealing surface of the male sub to the end of a female sub.

19. The method of claim 18, further comprising enclosing the sealing surface of the male sub and the end of a female sub within the passage of the wing nut.

* * * * *